United States Patent
Hautman et al.

(10) Patent No.: US 8,209,987 B2
(45) Date of Patent: Jul. 3, 2012

(54) AUGMENTOR PILOT

(75) Inventors: Donald J. Hautman, Marlborough, CT (US); Meredith B. Colket, III, Simsbury, CT (US); Jeffery A. Lovett, Tolland, CT (US); Torence P. Brogan, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 794 days.

(21) Appl. No.: 12/323,773

(22) Filed: Nov. 26, 2008

(65) Prior Publication Data

US 2010/0126177 A1 May 27, 2010

(51) Int. Cl.
    *F02K 3/10* (2006.01)
(52) U.S. Cl. .......................................................... 60/761
(58) Field of Classification Search ............. 60/761–766
    See application file for complete search history.

(56) References Cited

U.S. PATENT DOCUMENTS

| | | | | |
|---|---|---|---|---|
| 2,883,828 | A | * | 4/1959 | Howell ........................... 60/246 |
| 2,929,203 | A | * | 3/1960 | Henning, Jr. et al. ........... 60/762 |
| 3,656,301 | A | * | 4/1972 | Katz ............................... 60/236 |
| 3,931,707 | A | | 1/1976 | Vdoviak |
| 4,798,048 | A | | 1/1989 | Clements |
| 5,230,214 | A | | 7/1993 | Pechette |
| 5,385,015 | A | | 1/1995 | Clements et al. |
| 5,685,140 | A | | 11/1997 | Clements et al. |
| 2004/0216444 | A1 | * | 11/2004 | Lovett ............................. 60/204 |
| 2007/0006589 | A1 | * | 1/2007 | Muldoon et al. ................ 60/761 |
| 2007/0028621 | A1 | * | 2/2007 | Muldoon et al. ................ 60/761 |

* cited by examiner

*Primary Examiner* — Louis Casaregola
*Assistant Examiner* — Phutthiwat Wongwian
(74) *Attorney, Agent, or Firm* — Bachman & LaPointe, P.C.

(57) ABSTRACT

A gas turbine engine augmenter has a gas flowpath. A number of vanes extend into the gas flowpath. A number of augmenter fuel conduits have outlets along at least some of the vanes. At least one burner discharge outlet is along at least one of the vanes for discharging a pilot gas.

29 Claims, 7 Drawing Sheets

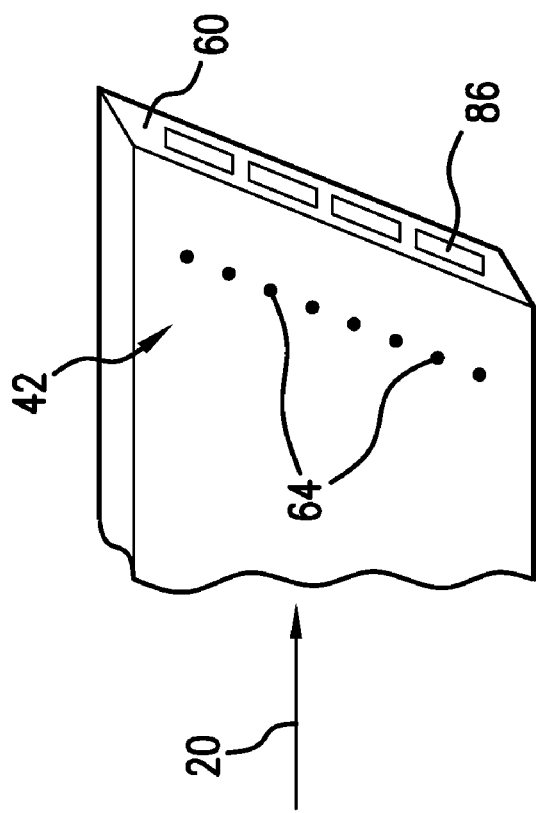
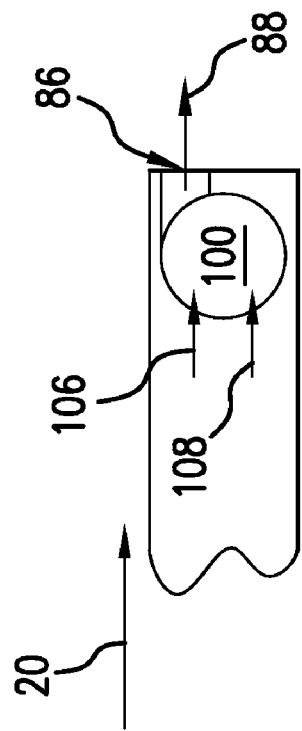

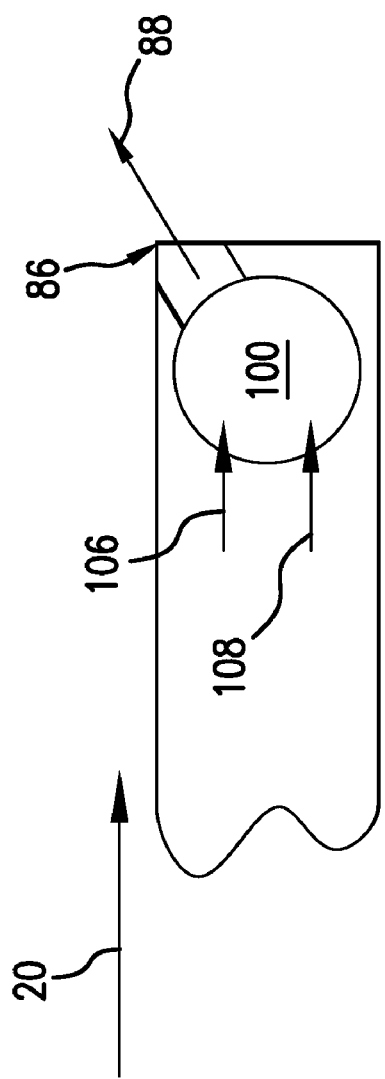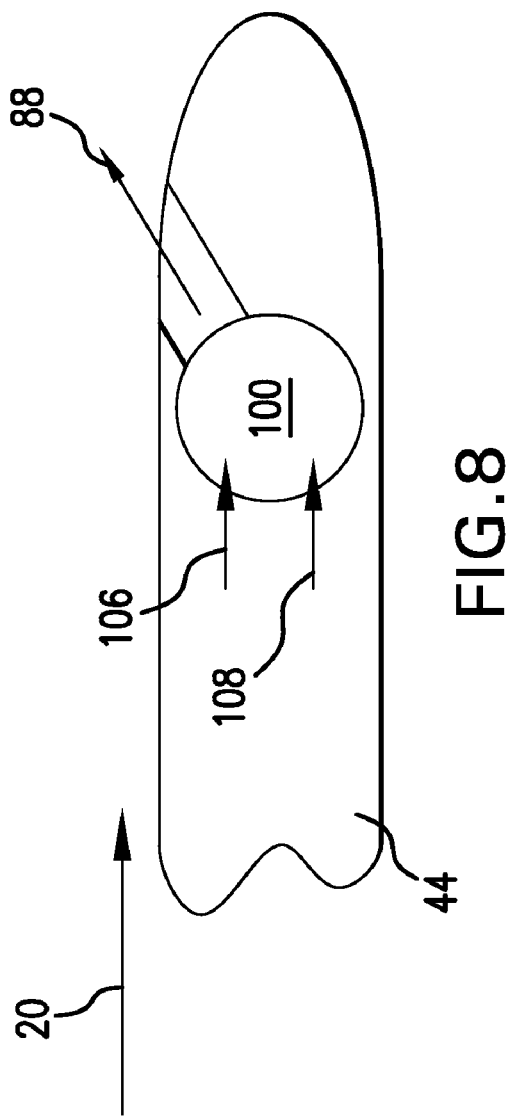

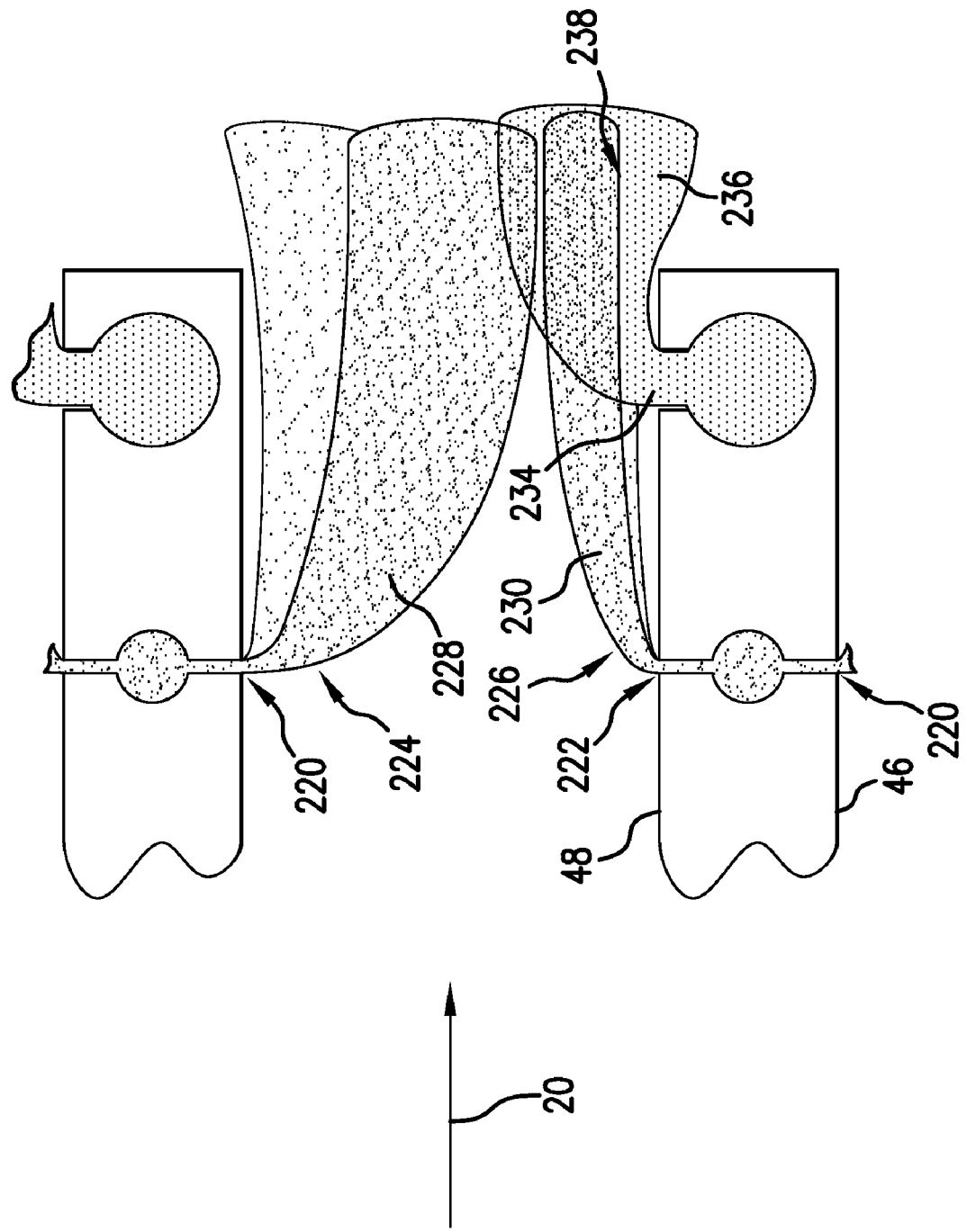

AUGMENTOR PILOT

BACKGROUND

The disclosure relates to gas turbine engine augmentors. More particularly, the disclosure relates to augmentor piloting.

High performance military gas turbine engines are usually equipped with an augmentor (afterburner) for increasing the thrust output of the engine. The augmentor is typically located at the end of the turbomachinery in a duct just upstream/ahead of the exit nozzle of the engine. The augmentor provides additional thrust by injecting additional fuel and burning it in this duct. Combustion of the additional fuel typically consumes the remaining oxygen in the flow.

To maximize the additional thrust: a pilot flame is stabilized in the duct; the additional fuel and residual air are well distributed/mixed; and the chemical reaction is at least nearly completed within the augmentor duct before entering the exhaust nozzle.

When the augmentor is not in use, it creates a pressure loss (known as a "dry" pressure loss). Recent augmentor configurations have been developed to reduce the dry pressure loss. In such augmentors, the flame is stabilized on the rear/trailing/downstream edge/face of the exit vanes with close-coupled fuel injection ports (e.g., U.S. Pat. No. 5,685,140). This helps to avoid pressure loss characteristic of so-called "v-gutter" flameholders and other similar flame stabilization devices. Fuel is injected upstream of the downstream face of the vane to provide a desired fuel-air mixture to the wake region downstream of the flameholder for flame stabilization. For further decreases in the dry pressure loss and/or to provide other tactical advantages, the width of the flame stabilization surface is minimized. Reduction in the vane width reduces the ability of the vane to stabilize the flame.

To increase the robustness of these vane-stabilized flames, systems with continuous pilots have been developed. Rearward facing annular steps along the inside diameter (ID) or outside diameter (OD) of the augmentor have been designed to stabilize the flame (e.g., U.S. Pat. Nos. 4,798,048 and 5,230,214). Exhaust products from this flame naturally draft respectively outward or inward along the rear face of each vane and stabilize the combustion process along the rear of the vanes. For more robust flame stabilization, pilot burner(s) may be utilized with a high velocity jet exhaust directed along the rearward facing edge of the vane (e.g., U.S. Pat. No. 5,385,015). Augmentor configurations exist with the pilot gases traveling either from the OD inward or ID outward.

Problems with such designs include the difficulty to guarantee that the pilot flame gases will be transported along nearly the full radial length/span of the vane. Also, despite continuous pilot operation, the flame is not held robustly to the vane, leading to flame dynamics (rumble and/or screech) or to blowout. Furthermore, it is difficult to simultaneously achieve the desired fueling rate for optimum flame stabilization in the wake of the vane while still obtaining uniform fuel injection/spreading across the flow field to attain high combustion efficiency. Injection of fuel along the side of the vane must satisfy both of these constraints; so control of fuel injection to maintain a combustible mixture along the fuel length of this vane wake region, may produce a poor distribution of fuel and air in the remainder of the duct, leading to augmentor inefficiency. Furthermore, it is even more challenging to develop one design to satisfactorily meet such demands over the entire operating flight envelope or substantial portion thereof.

It is therefore desirable to provide an augmentor with an advantageous combination of: continuous and stable anchoring of the flame across the stabilization surface; independent control of flame stabilization; and overall augmentor efficiency.

SUMMARY

One aspect of the disclosure involves a gas turbine engine augmentor having a gas flowpath. A plurality of vanes extend into the gas flowpath. A plurality of augmentor fuel conduits have outlets along at least some of the vanes. A burner discharges pilot gas. One or more burner discharge conduits extend from the burner and have outlets along at least one of the vanes.

In various implementations, a centerbody may be in the gas flowpath. The burner may be in the centerbody. The vanes may have first and second sides. Some or all of the vanes may have the fuel conduit outlets and the burner discharge conduit outlets.

Other aspects of the disclosure involve operational and control considerations. Pilot stoichiometry and flow rate may be controlled by a control system responsive to one or more sensed conditions.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 is a side view of an alternate vane.

FIG. 6 is a cross-sectional view of the vane of FIG. 5, taken along line 6-6.

FIG. 7 is a cross-sectional view of a second alternate vane.

FIG. 8 is a cross-sectional view of a third alternate vane.

FIG. 10 is a cross-sectional view of a pair of third alternate vanes.

Like reference numbers and designations in the various drawings indicate like elements.

DETAILED DESCRIPTION

Figure 1:
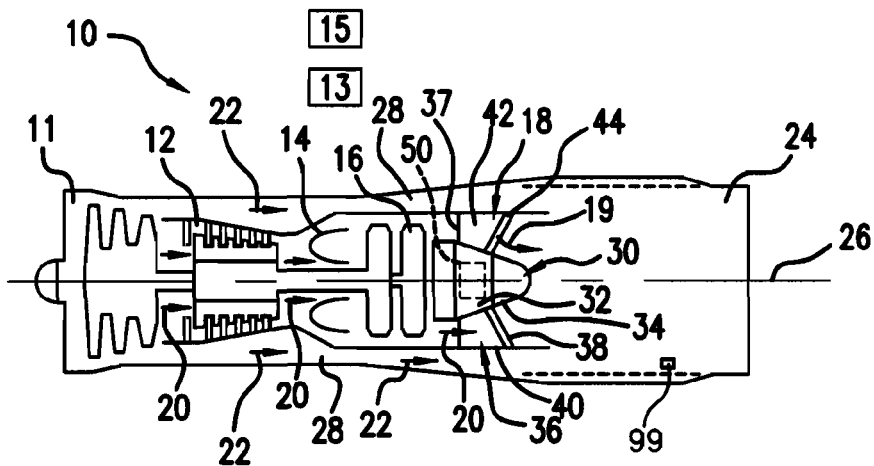
FIG. 1 is a longitudinal sectional view of a gas turbine engine.

FIG. 1 shows a gas turbine engine 10 comprising, from upstream to downstream and fore to aft, a fan 11, a compressor 12, a combustor 14, a turbine 16, and an augmentor 18. A fuel source 15 and a control system 13 may be fully or partially shared with other engines (if any). Details of engine operation, generally, and augmentor operation (including pilot burner operation), specifically, may be as known in the art or yet developed. In a basic operational process, air entering the fan 11 is divided between core gas flow 20 and bypass air flow 22. Core gas flow 20 follows a path initially passing through the compressor 12 and subsequently through the combustor 14 and turbine 16. Finally, the core gas flow 20 passes through the augmentor 18 where additional fuel 19 is selectively added, mixed with the flow 20, and burned to impart more energy to the flow 20 and consequently more thrust exiting an engine nozzle 24. Hence, core gas flow 20 may be described as following a path essentially parallel to the axis 26 of the engine 10, through the compressor 12, combustor 14, turbine 16, and augmentor 18. Bypass air 22 also follows a path parallel to the axis 26 of the engine 10, passing through an annulus 28 along the periphery of the engine 10 to merge with the flow 20 in the augmentor before the nozzle 24.

Figure 2:
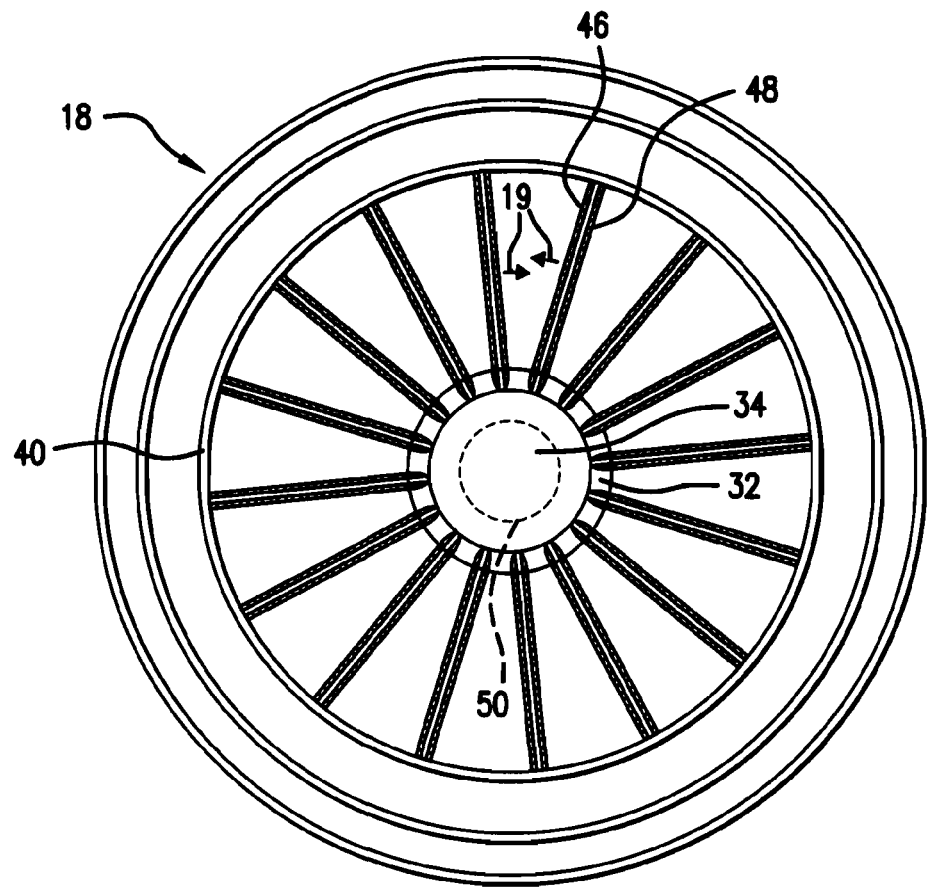
FIG. 2 is a forward-looking transverse view of an augmentor of the engine of FIG. 1.

The augmentor comprises a centerbody 30 generally symmetric around the axis 26 and formed as a portion of an engine hub. The exemplary centerbody has a main portion 32 and a tailcone 34 downstream thereof. Circumferentially arrayed vanes 36 have leading and trailing extremities 37 and 38 and extend generally radially between the centerbody 30 and a turbine exhaust case (TEC) 40. The core gas flow 20 passes between the vanes 36. Each of the vanes may be an assembly of a leading main body portion 42 and a trailing edge box 44. The vanes have circumferentially opposite first and second sides 46 and 48 (FIG. 2). The trailing edge box 44 may contain a spraybar (discussed below) for introducing the additional fuel 19 into the core gas flow 20. The centerbody may contain a burner 50 for combusting fuel to, in turn, initiate combustion of the fuel 19. Thus, the burner is distinct from the augmentor vanes in that the burning in the burner is separate from the burning it pilots downstream of the vanes. The burner 50 and spraybars may be supplied by the source 15 from one or more supply conduits (not shown). For centerbody burners or spraybar manifolds within the centerbody, the supply conduit (s) may extend through or along one or more of the vanes to the centerbody. For an externally configured pilot source, the supply conduit can be located external to the engine and extend from outside directly into the trailing edge box. As so far described, the engine configuration may be one of a number of existing engine configurations to which the present teachings may apply. However, the teachings may also apply to different engine configurations.

The present disclosure involves directly distributing some-to-all of the pilot gas along the radial length of the flame holder (stabilization) surface (e.g., of a vane). This high temperature pilot gas is injected into the core gas flow to provide continuous ignition source for the fresh fuel/air mixtures. The pilot gas may have a controlled equivalence ratio which will help to maintain the local equivalence ratio in a reactive region, despite changes to the fuel injection penetration to provide for robust flame stabilization and therefore maximize overall augmentor efficiency. For example, when the fuel spray penetrates toward the center of the vane passage and away from the vane sides, 46 or 48, the fresh fuel-air mixture near to the vanes will be fuel lean. The pilot gas may be overall fuel-rich which when mixed with the fuel-lean fresh mixture to provide robust combustion at or near the stoichiometric mixture ratio. This robust flame will then propagate to the remaining fuel-air mixture and provide good overall efficiency for the augmentor. Alternatively, under conditions in which the fuel penetration is low, the near-vane region will be overall fuel-rich. In such a case it will be preferable to operate the pilot to produce overall fuel-lean gases. When these pilot gases are injected into the reactive fresh fuel-rich mixture, a mixture at or near stoichiometric proportions is produced which will burn robustly and stabilize the flame in the augmentor. In this manner, control of the local equivalence ratio at the point of flame stabilization may be achieved by separate control of the fuel system for the pilot and the fuel system for the fresh fuel-air mixture. Consequently, the pilot gases (combustion gases) may consist of nearly complete burner exhaust (such as under pilot fuel lean conditions) or partially reacted burner exhaust (such as under pilot fuel-rich conditions).

The flame may be stabilized downstream of a bluff body (e.g., of trailing edge box) at the end of the vane 36. For such bluff-body flame stabilizers, stabilization may be limited by the fluid dynamic strain caused by the high velocity gases passing next to relatively stagnant gases behind the bluff body. The high velocity gradient at the edge of this bluff body encourages mixing between the reacted and unreacted gases and thus supports combustion. But at very high velocity gradients high shearing forces can quench or destabilize the combustion reactions. Pilot gases injected into the boundary layer near the end of the vane can be used to control the fluid dynamics and therefore enhance flame stability. In particular, the pilot gases may be directed in a manner to alter the local fluid dynamics to further extend the flame stabilization threshold.

Figure 3:
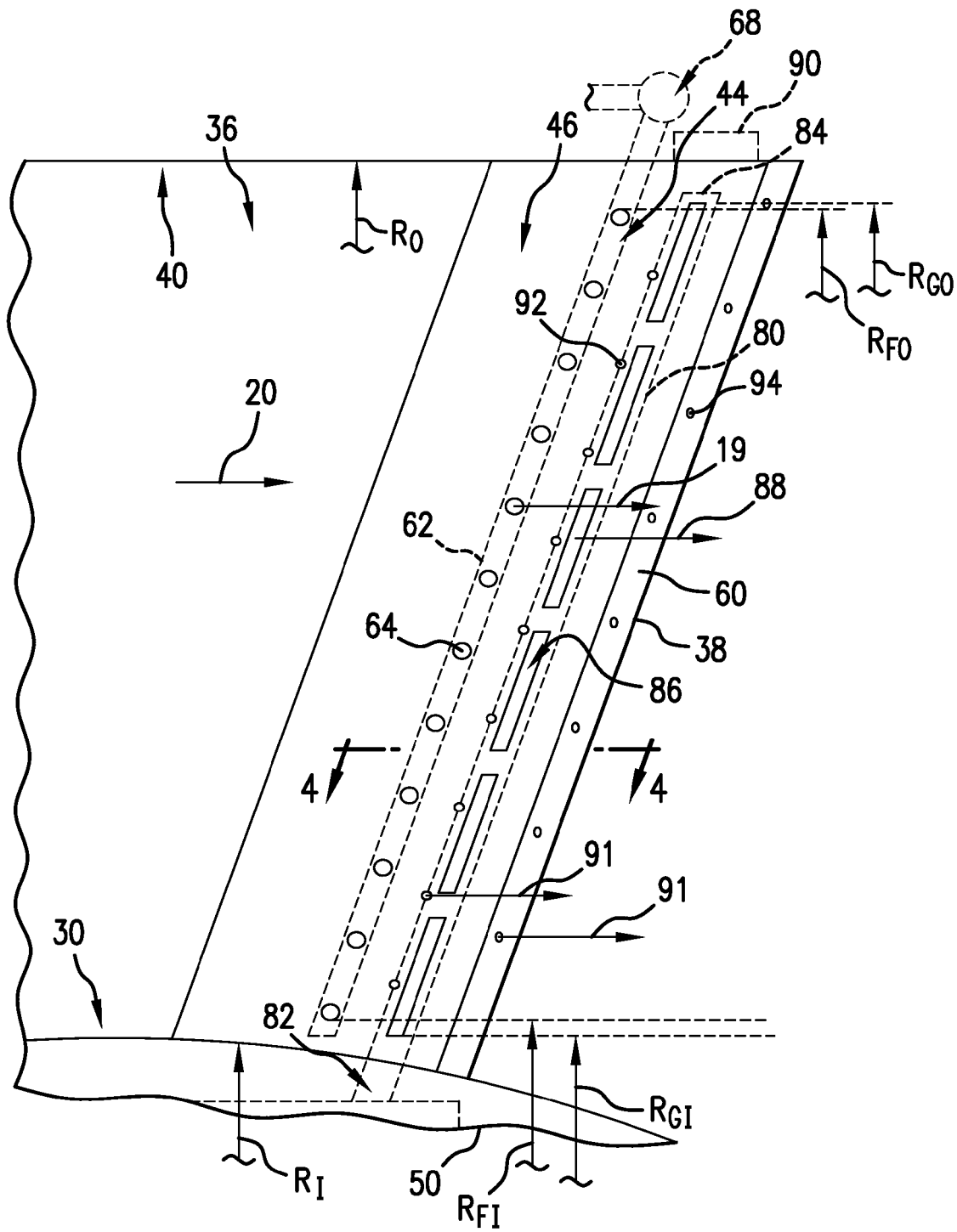
FIG. 3 is a side view of a vane of the augmentor of FIG. 2.

FIG. 3 shows the first side 46 of one of the vanes 36. The vane extends from the centerbody 30 to the exhaust case 40. A local radius of the centerbody is shown as $R_I$ which also forms the local inboard radius of the core flowpath. A local inner radius of the turbine exhaust case is shown as $R_O$ which also forms a local outboard radius of the core flowpath. $R_I$ and $R_O$ may vary longitudinally. An alternative location for pilot burners may be outside the core flowpath.

FIG. 3 shows the vane as having a flame stabilization surface 60 formed as an exemplary slightly off-transverse facet at the trailing extremity 38 and joining the first side 46 to the second side 48. Within the vane 36 (e.g., within the box 44) a fuel spraybar 62 extends and has nozzle outlets 64 along the vane side 46 for discharging the additional fuel 19. As is discussed below, such fuel nozzle outlets 64 may be located on one or both sides 46 and 48 and may or may not be symmetrically disposed across the vane. An inboard radial extreme of the array of outlets 64 is shown having a radius $R_{FI}$. An outboard extreme is shown having a radius $R_{FO}$ (e.g., respectively at the inboard and outboard extremes of the inboard and outboard extreme nozzles). The various spraybars 62 may be connected to a common manifold 68 for delivering fuel from the fuel source (e.g., the aircraft's fuel tanks).

The present disclosure, however, adds a pilot burner discharge conduit 80 extending from an inboard end 82 at the burner 50 to an outboard end 84. Such conduits 80 may be added to all vanes or a subset. The conduit 80 has an array of outlets 86 open to the vane surface along the side 46 or side 48 or both. Possible symmetries or asymmetries may be similar to those noted above for the fuel nozzle outlet 64 and are discussed further below. The outlets 86 discharge pilot combustion gas flows 88 which mix with the additional fuel 19 and the flow 20. The high temperature of the flows 88 serves to reliably initiate combustion of the additional fuel 19 and residual air in the flow 20.

Figure 4:
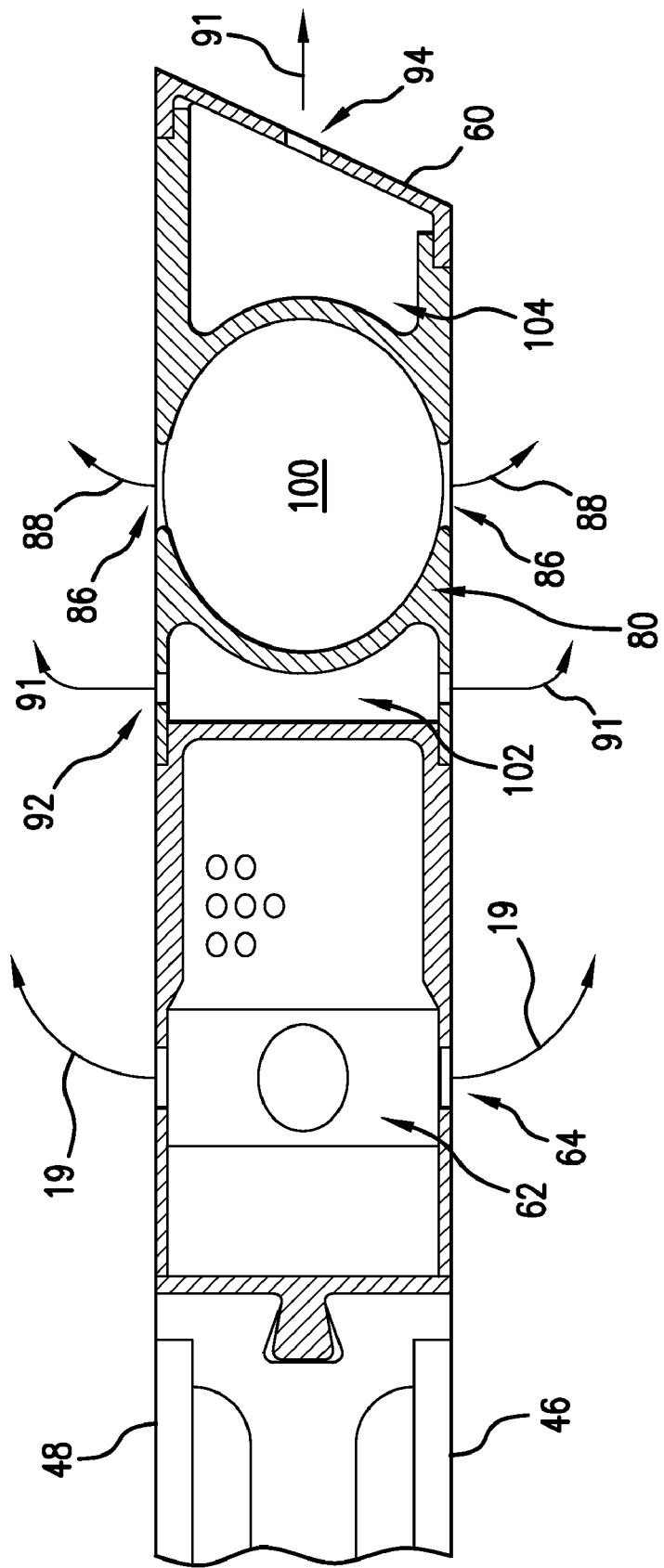
FIG. 4 is a cross-sectional view of the vane of FIG. 3, taken along line 4-4.

The passing of the pilot combustion gases through the vanes may further contribute to vane heating. Accordingly, it may be further advantageous to add supplemental cooling to the vane. FIG. 3 shows a bleed air manifold 90 positioned to direct bleed air through the vane adjacent the conduit 80. The bleed air may be vented out as jets 91 through outlet ports 92 and 94 respectively along the sides 46 and 48 and stabilization surface 60 of the vane. FIG. 4 shows an exemplary configuration wherein the conduit 80 is formed as a casting having a central passageway 100 and forming adjacent portions of the sides 46 and 48. The casting also forms lateral portions of respective upstream and downstream passageways 102 and 104 carrying the cooling air from the manifold 90 along the length of the conduit 80.

A variety of radial distributions of the combustion gas outlets 86 are possible as are a variety of longitudinal distributions and orientations (e.g., as discussed below). Similarly, bleed outlet (if any) distribution may vary. An exemplary distribution includes locating combustion gas outlets and bleed outlets in a broad distribution (e.g., such outlets falling at least partially along each of an inboard third, an outboard third, and a central third of the radial span of the core flowpath and vane. The burner discharge conduit may extend for at least half a radial span of the associated vane, more narrowly, at least 80%, similarly, the outlets may extend along the radial span (i.e., between the inboardmost and outboardmost outlets) of at least half a radial span of the associated vane.

FIGS. 5 and 6 show an alternate configuration wherein the gas outlets 86 are located along the stabilization surface 60. Pilot gases are generated within the piloting source and ducted through the trailing edge. FIGS. 5 and 6 show an embodiment that issues pilot gases that may be either fully combusted or partially combusted gases through the stabilization surface 60. These pilot gases add energy directly to the recirculation zone of the flameholding site. The pilot gases are entrained from the recirculation zone into the shear-layer to enhance the rate of combustion of the main fuel 19. This is in contrast to the pilot illustrated in FIGS. 3 and 4 which adds pilot gases to the outside of the shear layer bounding the recirculation zone. Ceramic material (not shown) in the trailing edge surface 60 may be provided to accommodate the high temperature gases. Alternatively, the control of flame temperature can also be used to limit heating of the stabilization surface. Control of flame temperature is achieved through the addition of fuel 106 and air 108 within the central passageway 100 for a prescribed composition and temperature of the pilot gases. Such control may be achieved via the control system responsive to appropriate sensor input. As described above, supplemental cooling may be provided in the surrounding structure.

A pilot source may also be directed into the shear layer (FIGS. 7 and 8). For purposes of illustration, FIG. 7 has a relatively bluff and non-angled vane trailing surface providing stabilization as described above. The pilot gases are generated within the piloting source and ducted through the trailing edge. Pilot gases are issued to the corner of the vane (rear edge of the stabilization surface 60). The pilot gases add energy directly to the shear-layer to enhance the rate of combustion of the main augmentor fuel 19. A distributed pilot along the edge of the trailing edge box may further be combined with the flameholder aerodynamic design in a way that stabilizes a flame in the absence of a stabilization surface 60. By injecting pilot gases directly to the shear-layer, the combustion of the main fuel and air is anchored directly from the piloting site distributed along the vane. In contrast to the trailing surface of FIG. 7, the FIG. 8 vane has a streamlined/tapering/rounded trailing edge surface which does not itself provide similar flame stabilization. However, the pilot outlet 86 is similarly positioned to that of FIG. 7 to discharge pilot-gases at or near the beginning of the terminal taper of the trailing edge.

Flow control for each embodiment above allows for the direct placement of pilot gases where they may provide added stability, and the direct mixture control of pilot gases with the fuel/air mixture from the main vane. This may be used in combination with cooling air for mixing of air and piloting source. In a redesign situation, this may also be used in combination with the design of the stabilization surface trading stability of the flameholder with stability added by the pilot.

Figure 9:
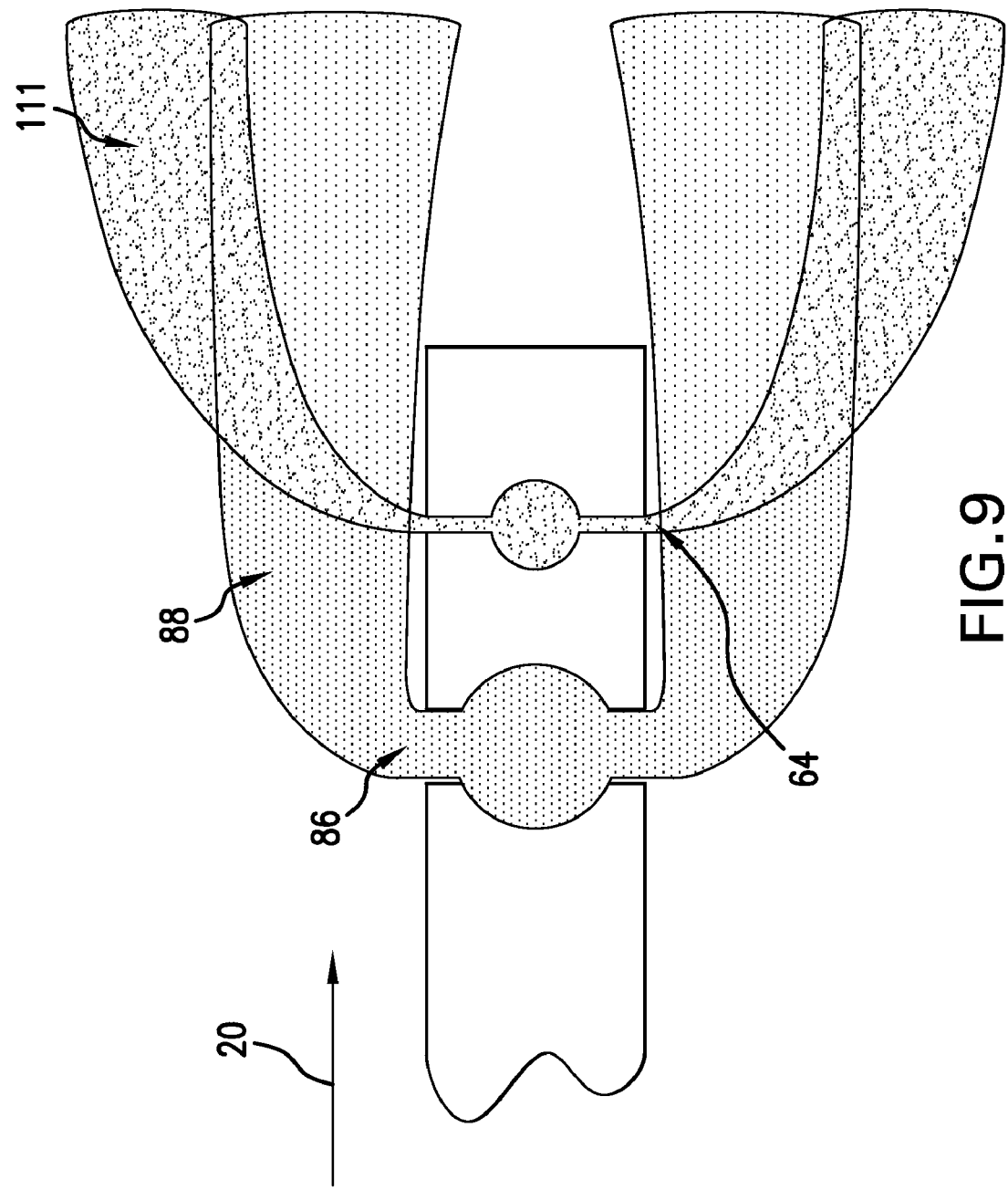
FIG. 9 is a cross-sectional view of a fourth alternate vane.

FIG. 9 shows a vane wherein, in a reversal of FIG. 4, the pilot gas outlets 86 are upstream of the fuel outlets (outlet nozzle 64). For ease of illustration, cooling air outlets (if present) are not shown. Interaction of the fuel jets with the pilot gases may be complex. FIG. 9 shows fuel jet cores 111 passing downstream but shedding droplets in circumferentially inboard regions. The hot pilot gas 88 aids in the evaporation and combustion of these droplets. As the mixture continues downstream, the flame is anchored on the stabilization surface 60 as in the other embodiments described. This may also be combined with designs that do not have a recirculation zone formed by a stabilization surface 60.

FIG. 10 shows an asymmetric implementation wherein, relative to FIG. 4, the pilot gas outlets are only along one side of each vane whereas fuel outlets are along both sides. The combination of piloting gases and fuel injection can be designed for an optimal combination of fuel distribution and stability in the main passage 20. Such configurations can lead to improved combustion efficiency. As a further example of asymmetry, the outlet nozzles 64 are replaced by different nozzles (differing from each other in size, distribution, or pattern) 220 and 222 on the sides 46 and 48, respectively. The nozzle outlets 220 discharge jets 224 whereas the nozzle outlets 222 discharge jets 226. The exemplary jets 224 have higher penetration (achieved by appropriate combination of higher speed, less diffusion, or other properties) than do the jets 226. As adjacent jets 224 and 226 proceed downstream, the core 228 of the jet 224 will occupy a greater circumferential space than the core 230 of the jet 226. The cores of the jets 226 will be more highly aligned with the associated pilot combustion gas flows 236 being discharged from outlets 234 on the sides 48. The mixing of the jets 226 with the flows 236 can create regions 238 providing flame stabilization.

The augmentor with a distributed pilot may offer one or more advantages not only in its geometric configuration but also in the flexibility of its operation. In operation, the fuel to air ratio or the mass flow of the pilot may vary dependent on flight conditions and may be set to maximize flame stability and augmentor efficiency while minimizing instabilities such as screech and rumble. At different operating conditions, the additional fuel from nozzles 64 may vary and the penetration of the fuel jet may vary. To counteract these changes in fuel spray penetration or other augmentor performance criteria, the fuel to air ratio of the pilot may be altered to ensure near stoichiometric conditions, peak temperatures and optimum flame stability. In addition the total mass flow of the pilot may be varied to affect the fluid dynamics in the flame stabilization region and thus optimize flame stabilization and augmentor efficiency. Alternatively, these same parameters may be adjusted to avoid screech and rumble, or otherwise avoid operating conditions that may be deleterious to performance or hardware durability.

In an example of operation, the engine begins in a powered state without thrust augmentation. When the augmentation is initiated by advancing the thrust request, the pilot source 50 initiates combustion. A combusted mixture originating in the pilot source is supplied to the flameholders. Subsequently, higher thrust levels are achieved after the pilot source is on by adding fuel flow to the flameholding assembly through the spraybars 62. Any level of thrust augmentation can be achieved from the minimum to maximum levels by adding fuel through the spraybars. The minimum level is determined by the amount of fuel flow in the pilot source, which is typically 1% to 5% (by mass rate) of the core flow. The maximum level is determined by the fueling level that consumes all oxygen in the exhaust system. When augmentation is cancelled by removing the thrust request, the fuel from the spraybars is decreased first, then the piloting system is turned off for non-augmented engine operation.

For any given operational condition in flight, the pilot source mixture is determined through a pre-set amount of fuel/air mixture programmed into the control system 13. These levels of pilot mixture are established through analysis for an appropriate combination of maximum flame stability and maximum efficiency for augmentation. Pilot settings can be determined through a combination of any number of control variables, including, but not limited to, air speed, altitude, throttle position, augmentor pressure, augmentor temperature, augmentor flow velocity, and augmentor fuel flow. The pilot source mixture can also be scheduled adaptively (by the control system 13) for active alteration of the stability condition(s).

The operation of the piloting system is applicable to transient operation similar to steady state operation described above. Additional control considerations may be applied during transient behavior to use the distributed piloting technique for additional flameholding stability. Transient operation includes but is not limited to aircraft maneuvers, fast augmentor sequencing from minimum levels of thrust to maximum levels of thrust, augmenter sequencing during part-power engine operation, and engine fault accommodation.

It may also be advantageous to schedule the distributed pilot source mixture based on sensed conditions in the core 24. Exemplary sensed conditions are determined with a sensor (schematically shown as 99) located in the core to measure oscillations in pressure or heat release, or any quantity derived from these. The measured oscillations are input to the engine control system, and the engine control system provides an alternate fuel setting to the pilot burner 50 and pilot gases 88. With an alternate fuel setting, the oscillations are suppressed as a result of the new operating point. The operation of adaptively scheduling the distributed pilot applies to both flameholding stability and thermo-acoustic instability.

One or more embodiments have been described. Nevertheless, it will be understood that various modifications may be made. For example, when implemented in the remanufacturing or reengineering of a given engine or its configuration, generally, or the augmenter narrowly, details of the existing engine or augmenter configuration may influence details of the particular implementation. Accordingly, other embodiments are within the scope of the following claims.

What is claimed is:

1. A gas turbine engine augmentor comprising:
a gas flowpath;
a plurality of vanes extending into the gas flowpath;
a plurality of augmentor fuel conduits having outlets along at least some of the vanes;
a burner distinct from the augmentor vanes;
a burner discharge conduit for discharging combustion gases from the burner and coupled to the burner and extending through at least one of the vanes; and
at least one burner discharge outlet of said burner discharge conduit along said at least one of the vanes.

2. The apparatus of claim 1 wherein:
the augmentor has a centerbody in the gas flowpath; and
the plurality of vanes extending from the centerbody into the gas flowpath.

3. The apparatus of claim 1 wherein:
the burner is in the centerbody.

4. The apparatus of claim 1 wherein:
all of the vanes have first and second sides;
all of the vanes have said fuel conduit outlets; and
all of the vanes have said burner discharge outlets.

5. The apparatus of claim 4 wherein:
said fuel conduit outlets are along both the first and second sides; and
said burner discharge outlets are along only the second sides.

6. The apparatus of claim 4 wherein:
said fuel conduit outlets are along both the first and second sides; and
said burner discharge outlets are along both the first and second sides.

7. The apparatus of claim 1 further comprising:
a plurality of coolant passageways in heat exchange relation with the burner discharge conduits; and
a plurality outlets from the coolant passageways along at least some of the vanes.

8. The apparatus of claim 7 wherein:
the burner discharge outlet is from a burner discharge conduit coupled to the burner.

9. The apparatus of claim 8 wherein:
each burner discharge conduit is at least partially formed by a casting; and
each coolant passageway is at least partially formed by said casting of the associated burner discharge conduit.

10. The apparatus of claim 8 wherein for each vane:
a first plurality of said coolant passageway outlets are upstream of the associated burner discharge conduit outlets; and
a second plurality of said coolant passageway outlets are downstream of the associated burner discharge outlets.

11. The apparatus of claim 7 wherein:
said burner discharge conduit extends for at least half a radial span of the associated vanes.

12. The apparatus of claim 7 wherein:
said burner discharge conduit extends for at least 80% of a radial span of the associated vanes.

13. The apparatus of claim 7 wherein:
said burner discharge outlets extend along a radial span of at least half a radial span of the associated vanes.

14. A gas turbine engine augmentor comprising:
a gas flowpath;
a plurality of vanes extending into the gas flowpath;
a plurality of augmentor fuel conduits having outlets along at least some of the vanes; and
means for providing a pilot gas and passing said gas through at least one of the vanes, at least one outlet of said means along said at least one of the vanes.

15. A method for operating a gas turbine engine augmentor comprising: a gas flowpath; a plurality of vanes extending into the gas flowpath; a plurality of augmentor fuel conduits having outlets along at least some of the vanes; a burner distinct from the augmentor vanes; and a plurality of burner discharge conduits extending from the burner and having outlets along at least some of the vanes, the method comprising:
combusting fuel in the burner to produce combustion gases;
passing the combustion gases through said at least some of the vanes via the burner discharge conduits; and
discharging the combustion gases from the burner discharge conduit outlets.

16. The method of claim 15 wherein:
the combusting is actively controlled responsive to one or more sensed conditions.

17. The method of claim 15 wherein:
the discharging comprises discharging more from one side of each vane than an opposite side.

18. The method of claim 15 wherein:
the discharging comprises discharging along a radial span of at least half of each vane.

19. The method of claim 15 wherein:
the discharging comprises discharging from a trailing face of the vane.

20. The method of claim 15 further comprising:
discharging augmentor fuel from the augmentor fuel conduit outlets to mix with and be ignited by the discharged combustion gases.

21. The method of claim 15 further comprising:
passing bleed air through the vanes to cool the burner discharge conduits.

22. A method for remanufacturing a gas turbine engine from a baseline configuration to a second configuration, the baseline configuration comprising:
a compressor;
a combustor downstream of the compressor;
a turbine downstream of the combustor;
an augmentor comprising:
a gas flowpath;
a centerbody in the gas flowpath;
a plurality of vanes extending from the centerbody into the gas flowpath;
a plurality of augmentor fuel conduits having outlets along at least some of the vanes; and
a burner in the centerbody,
the method comprising:
adding a plurality of burner discharge conduits extending from the burner through at least some of the vanes and having outlets along said at least some of the vanes.

23. The method of claim 22 wherein:
the baseline configuration has burner outlets only along the centerbody; and
the second configuration lacks burner outlets along the centerbody.

24. The method of claim 22 wherein:
the baseline configuration lacks burner outlets along an outboard 70% of a vane span; and
the second configuration has burner outlets along 50% of the vane span.

25. The method of claim 22 further comprising at least one of:
adding a bleed air conduit within each vane; and
placing the bleed air conduit in heat exchange relation with each burner discharge conduit.

26. A gas turbine engine augmentor comprising:
a gas flowpath;
a plurality of vanes extending into the gas flowpath;
a plurality of augmentor fuel conduits having outlets along at least some of the vanes; and
a burner distinct from the augmentor vanes, wherein:
at least one burner discharge outlet open to a surface of said at least one of the vanes for discharging combustion gases from the burner.

27. A gas turbine engine augmentor comprising:
a gas flowpath;
a plurality of vanes extending into the gas flowpath;
a plurality of augmentor fuel conduits having outlets along at least some of the vanes; and
a burner distinct from the augmentor vanes, wherein:
at least one burner discharge outlet through at least one of the vanes for discharging combustion gases from the burner.

28. The method of claim 15 wherein:
the combustion gases are pilot gases;
augmentor fuel is discharged from the augmentor fuel conduits; and
the pilot gases pilot combustion of the augmentor fuel.

29. The method of claim 28 wherein:
said at least some of the vanes have a tapering trailing edge so that the pilot gases serve to stabilize a flame.

* * * * *